A. C. LINDGREN & G. G. MANDT.
MANURE SPREADER.
APPLICATION FILED DEC. 20, 1909. RENEWED JULY 8, 1914.
1,107,329.
Patented Aug. 18, 1914.
7 SHEETS—SHEET 1.
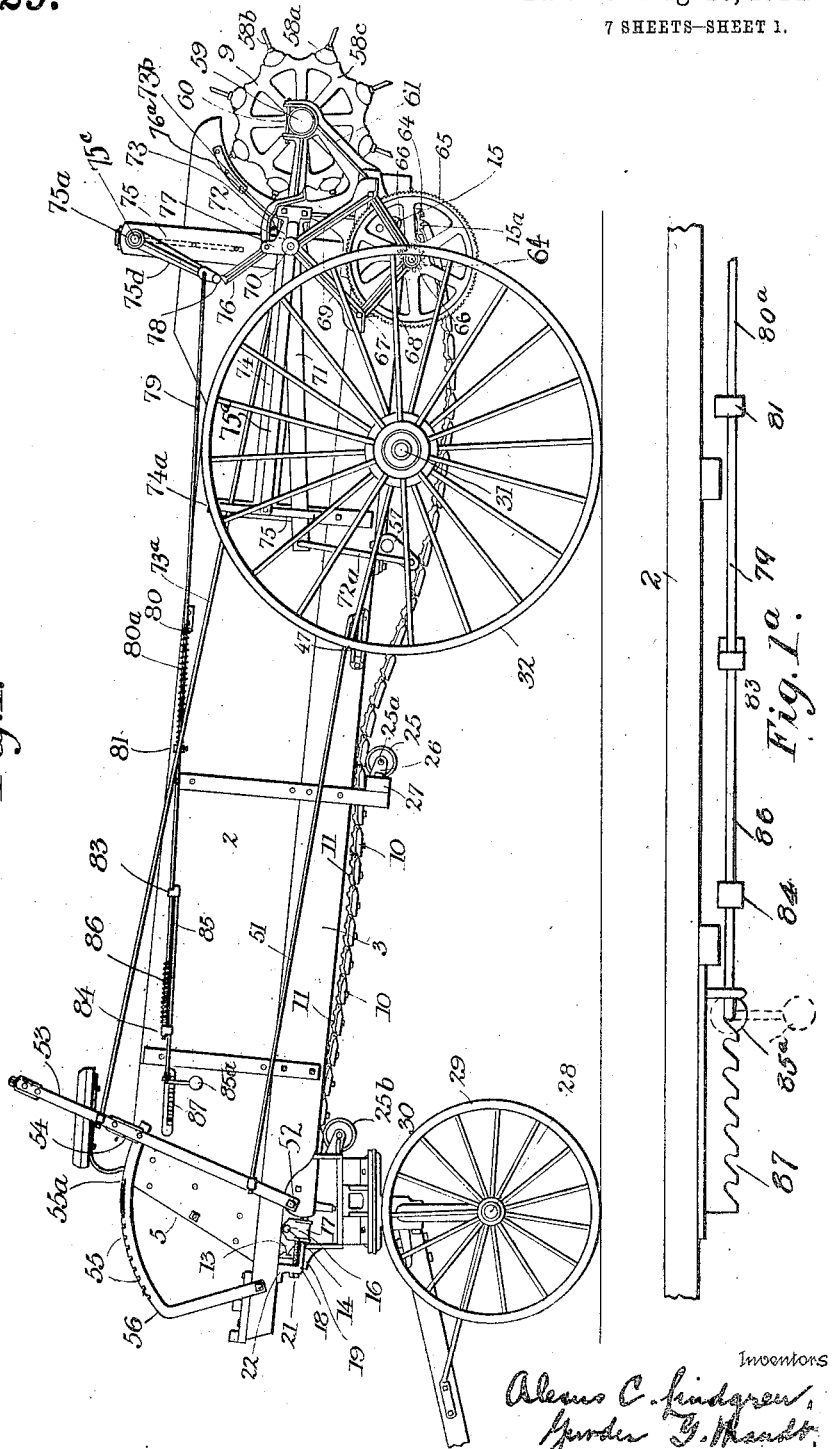

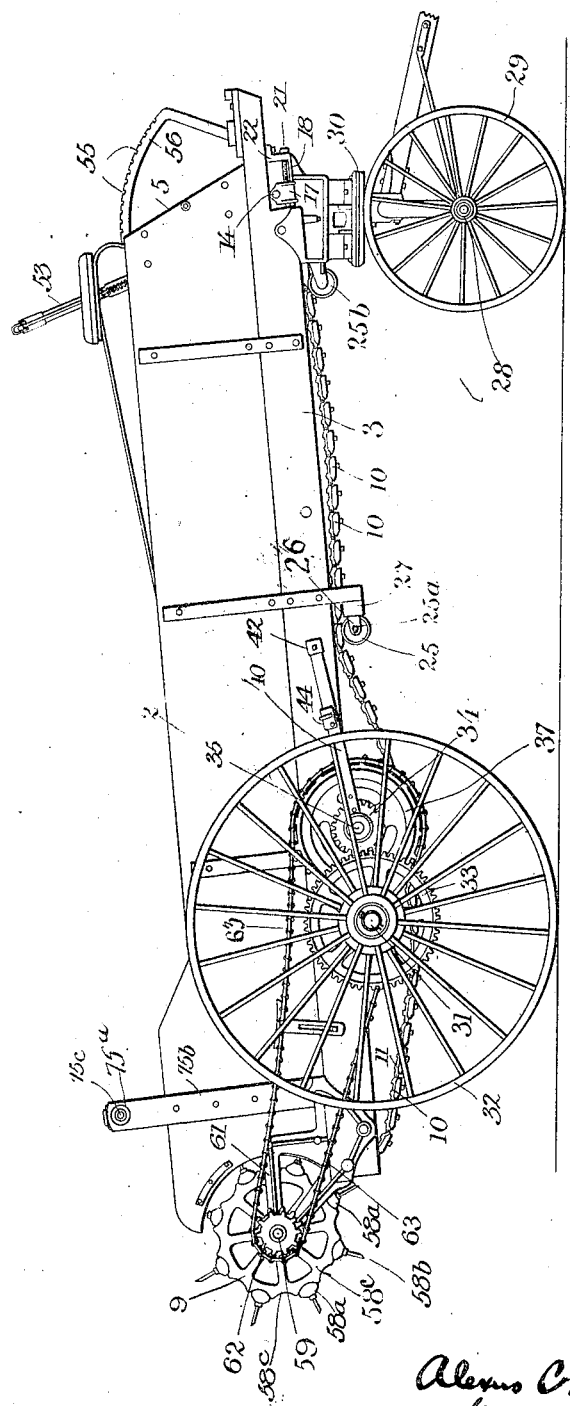

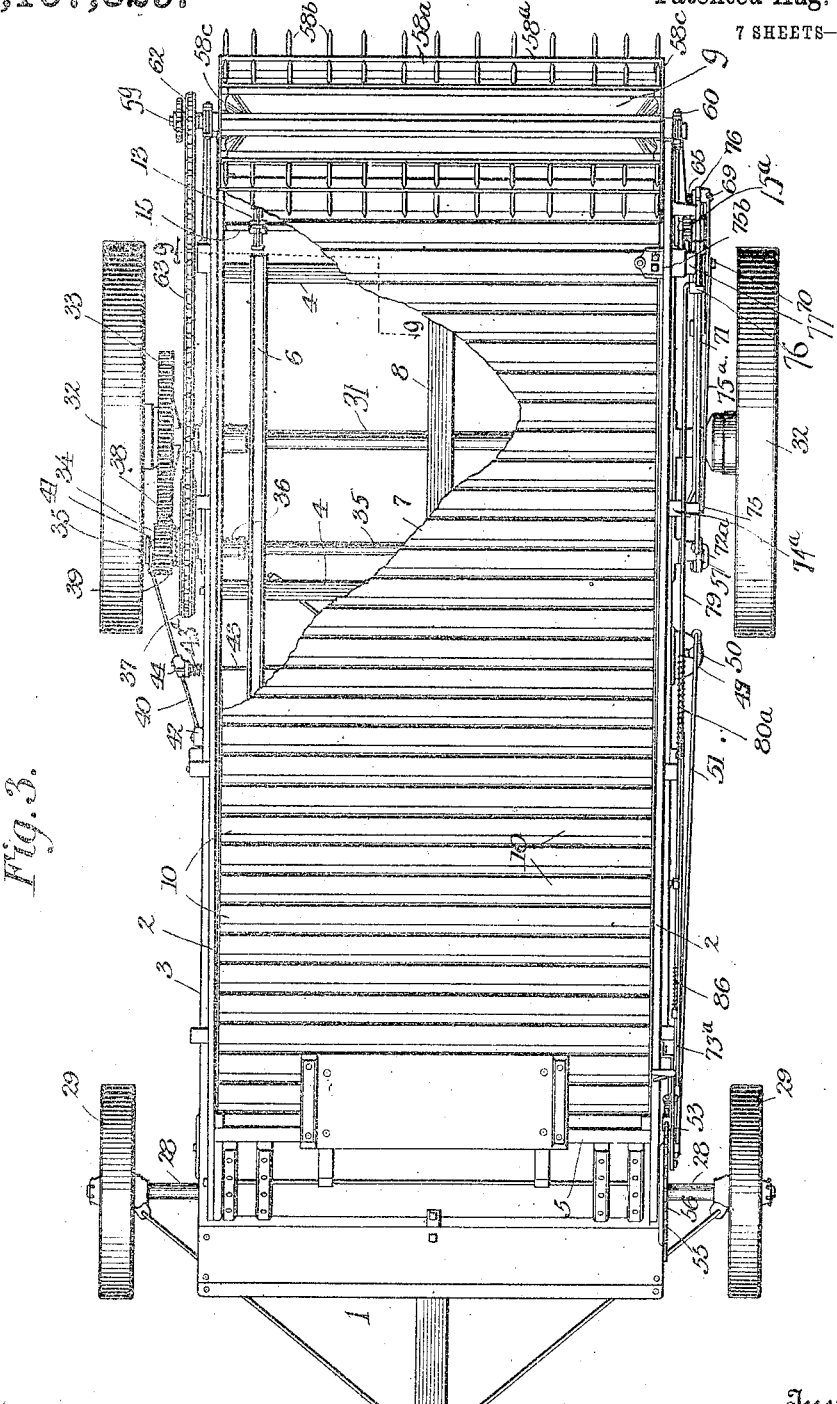

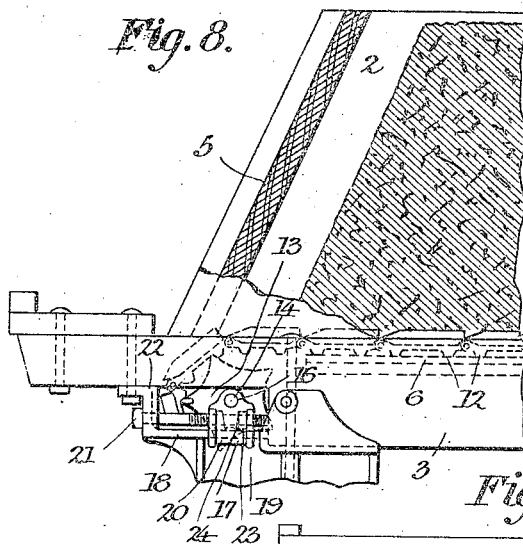
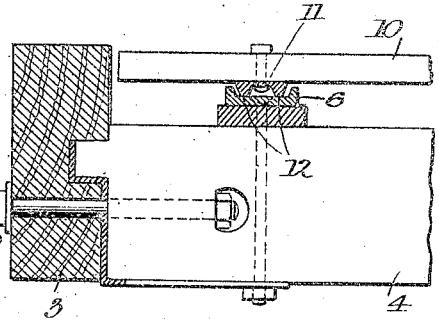
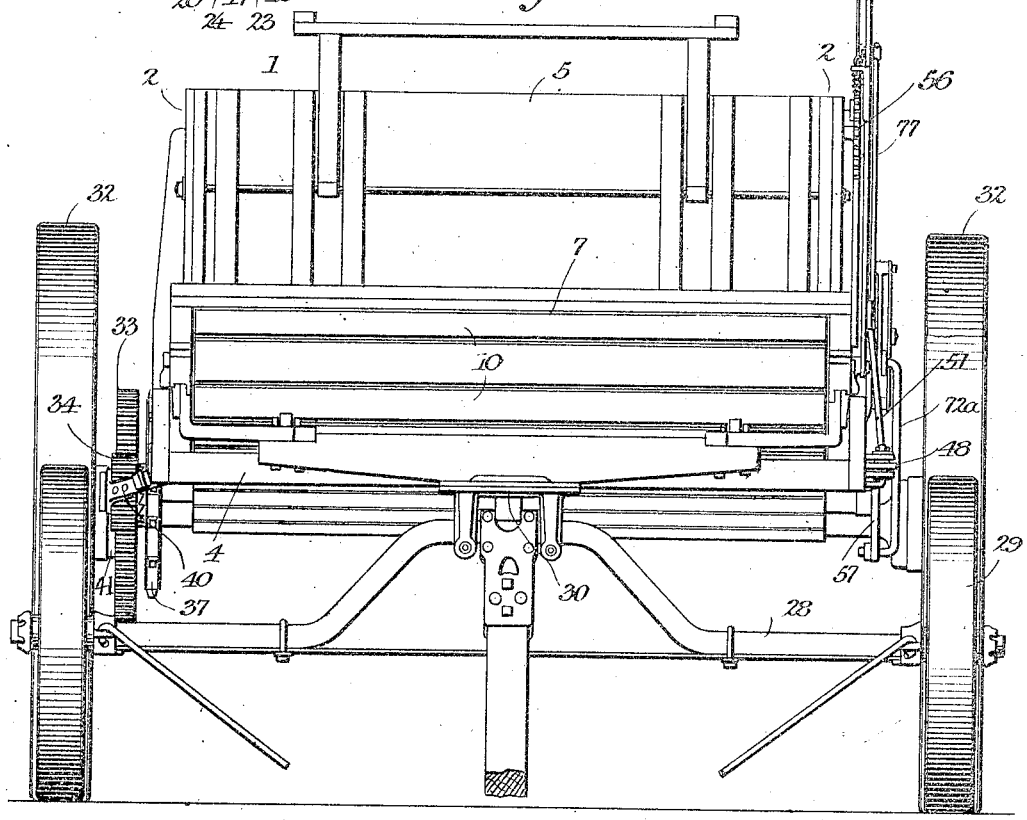

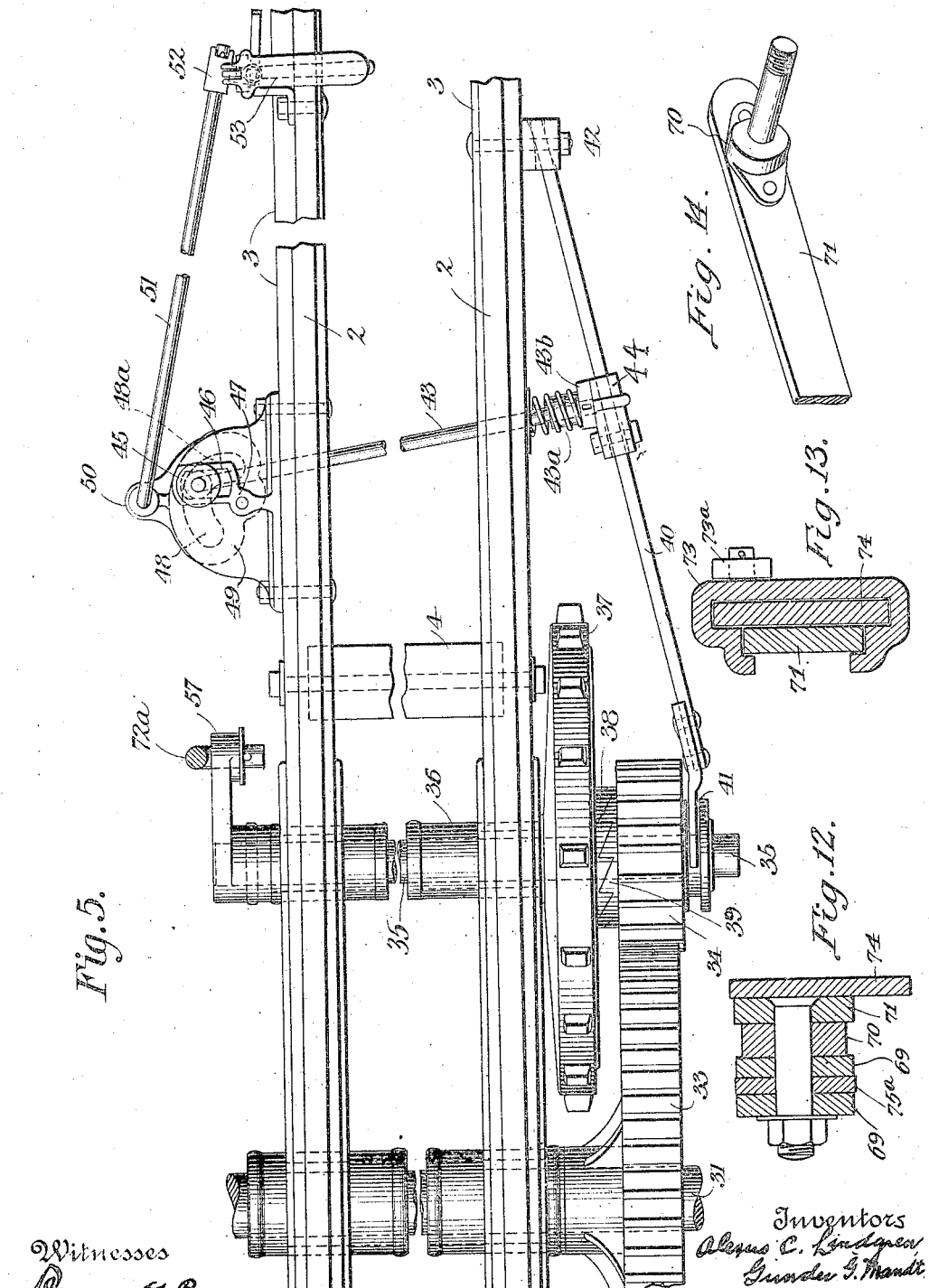

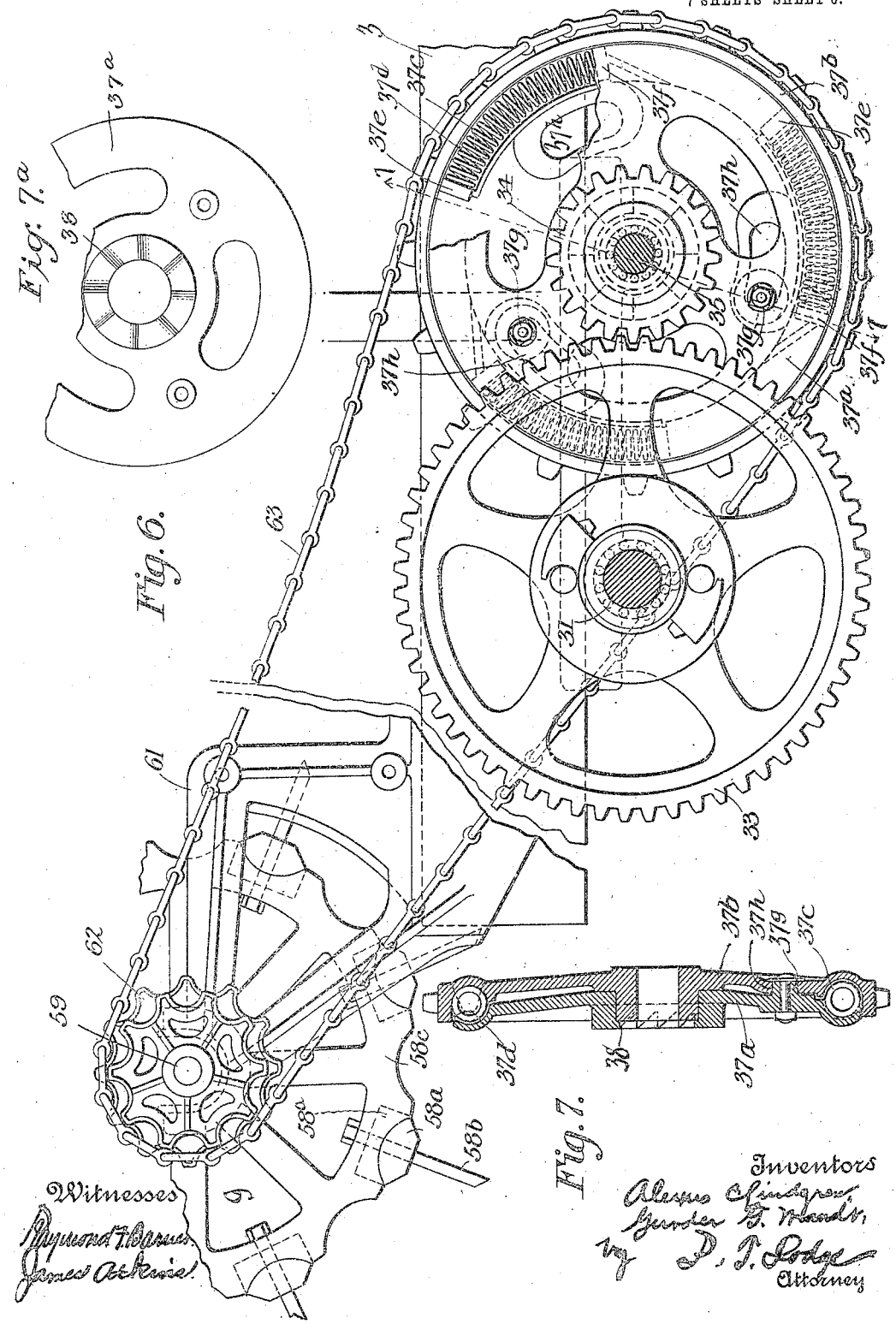

A. C. LINDGREN & G. G. MANDT.
MANURE SPREADER.
APPLICATION FILED DEC. 20, 1909. RENEWED JULY 8, 1914.
1,107,329.
Patented Aug. 18, 1914.
7 SHEETS—SHEET 7.
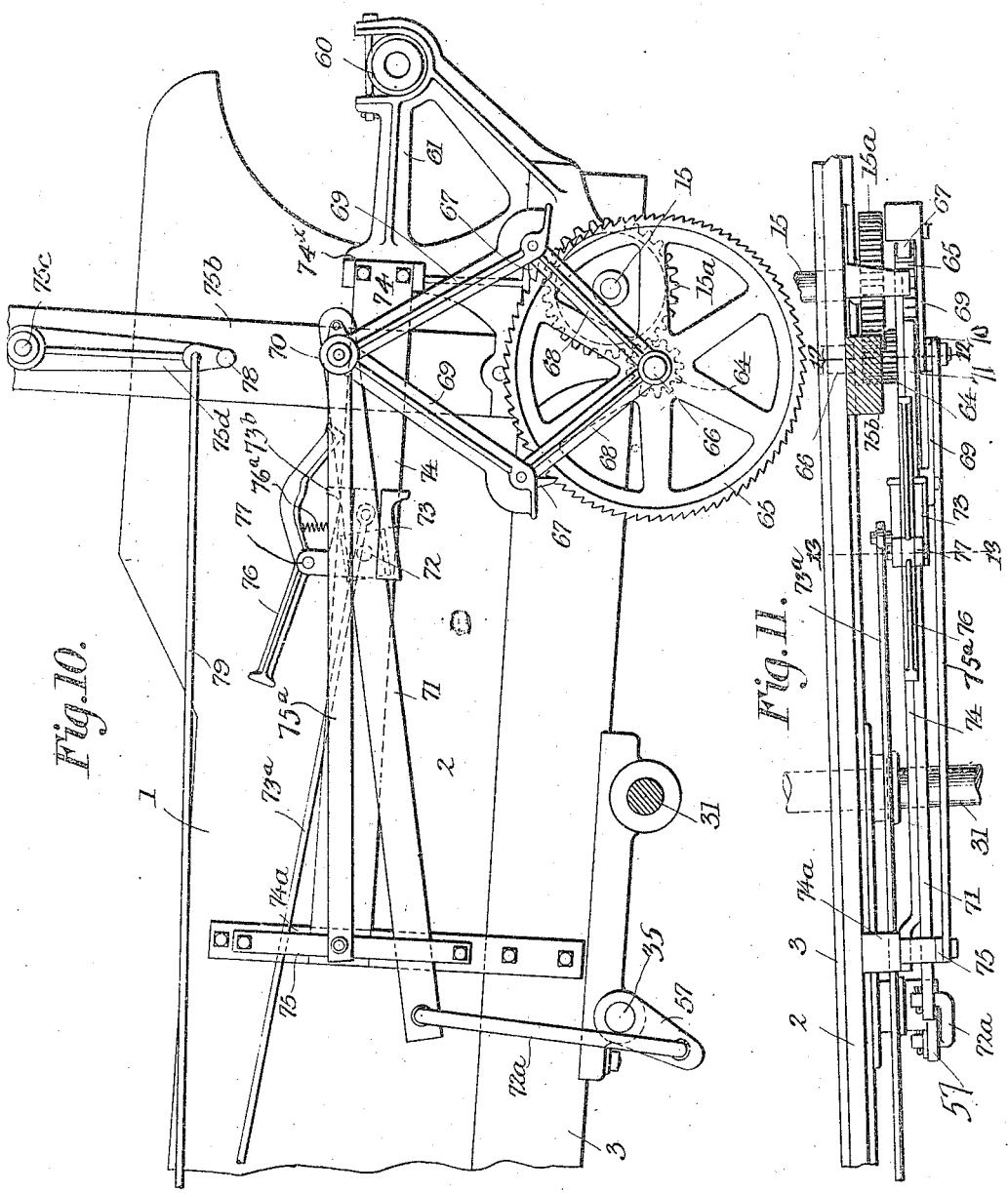

UNITED STATES PATENT OFFICE.

ALEXUS C. LINDGREN AND GUNDER G. MANDT, OF MOLINE, ILLINOIS, ASSIGNORS TO MOLINE PLOW COMPANY, A CORPORATION OF ILLINOIS.

MANURE-SPREADER.

1,107,329.  Specification of Letters Patent.  Patented Aug. 18, 1914.

Application filed December 20, 1909, Serial No. 533,992. Renewed July 8, 1914. Serial No. 849,834.

*To all whom it may concern:*

Be it known that we, ALEXUS C. LINDGREN and GUNDER G. MANDT, citizens of the United States, both of Moline, county of Rock Island, and State of Illinois, have invented a new and useful Improvement in Manure-Spreaders, of which the following is a specification.

This invention relates to manure spreaders of that class in which an open box or body carried by ground-wheels is provided with an endless load-carrying apron, the apron being adapted to be operated by mechanism driven from the ground-wheels and to deliver its load to a toothed distributor-cylinder rotatively actuated by gearing also driven by the ground-wheels and acting to remove the load from the apron and deliver and distribute it. In machines of this class, it has been the practice to drive the load-carrying apron and the distributor-cylinder (generally known as a beater) by separate gearing operated from the ground-wheels, and to connect and disconnect such driving mechanism by separate devices, such as a clutch under the control of the operator; and, usually, in these machines, it is necessary for the attendant to actuate a plurality of devices to start or arrest the apron-driving and beater-driving mechanisms.

It is the object of the present invention to provide a machine wherein the entire operating mechanism thereof is actuated by the attendant by means of a single device conveniently disposed adjacent the driver's seat and whereby the travel of the load-carrying apron, its speed, etc., may be controlled.

The invention consists, primarily, in an endless load-carrying apron combined with mechanism for driving or actuating the same, whereby its operation may be effected and its rate of travel may instantly and conveniently be changed or varied to cause it to deliver a predetermined quantity of material to the beater within a given time.

The invention consists, also, in a beater, a beater-driving mechanism, and a rake, and in combining, with the apron-driving and speed changing mechanisms, a control-lever which acts, by movement in one direction, first to cause the beater-drive to be actuated, and the rake to be simultaneously and automatically released; then, by further movement of said lever in the same direction, to cause the apron-drive mechanism to be operated; and, finally, by continued movement of the lever, to accelerate the travel of the apron and, in consequence, to cause the machine to discharge a greater quantity of the material within a given area of its operation.

The invention consists, also, in an improved form of apron for carrying the load, whereby the material is prevented from shifting or sliding on the apron while it is being subjected to pressure by the beater-cylinder as the load is being presented thereto; and, also, in an improved construction of support for said apron.

The invention consists, also, in an improved construction of driving mechanism for actuating the beater-cylinder, whereby the strain or impact of the driving members, due to the resistance offered to the beater-cylinder in starting and in overcoming inequalities in the material to be distributed, is absorbed by cushioning-devices included in said driving mechanism.

The invention consists, further, in an improved form of clutch-controlling mechanism whereby the ground-wheels are coupled to the beater-cylinder-drive mechanism, and to the countershaft which actuates the apron-driving mechanism, and in combining, with such clutch-controlling mechanism, means for connecting the same to the control-lever whereby a wide range of movement of said lever, after the clutch is in engagement, is permitted without disturbing the interlocked condition of said clutch.

The invention consists, also, in improved means for locking, releasing, and controlling the tension of the rake by which undue pressure on the beater-cylinder by the load is prevented, and by which the rake is automatically controlled and released.

The invention also consists, generally, in certain details of construction and relative arrangement of parts described in the following specification, and specifically pointed out in the claims.

In the accompanying drawings: Figure 1 is an elevation of the right-hand side of a vehicle constructed in accordance with this invention. Fig. 1ª is a fragmentary view, in plan, of certain of the parts of the rake-controlling mechanism. Fig. 2 is a similar elevation of the left-hand side of the vehicle. Fig. 3 is a plan view of the same with portions of the apron broken away to show the underlying frame-work, etc. Fig. 4 is an elevation of the front end of the machine. Fig. 5 is a detailed sectional plan, on an enlarged scale, illustrating the construction of the clutch-mechanism whereby the ground-wheels are connected to the driving mechanism. Fig. 6 is a sectional elevation, on an enlarged scale, showing the mechanism for driving the distributor or beater-cylinder, portions of the sprocket which carries the cushioning devices being broken away to show the interior of the structure. Fig. 7 is a cross-section on the line 7—7 of the said cushion-sprocket. Fig. 7ª is a view in front elevation of a part of the cushion-sprocket. Fig. 8 is a detail of the front end of the box or body of the machine showing the inclined end-board; and, also, means for adjusting the position of the apron-carrying shafts. Fig. 9 is an enlarged detail on the line 9—9 of Fig. 3, showing the means for supporting and carrying the traveling apron. Figs. 10 and 11 are details of the apron-operating and speed-changing mechanisms. Figs. 12 and 13 are fragmentary views, in vertical section, taken respectively on lines 12—12 and 13—13, Fig. 11; and Fig. 14 is a fragmentary view in perspective of the walking-beam forming a part of the apron drive mechanism.

Referring to the drawings, 1 designates an open box or body similar to that of an ordinary farm wagon, but without the usual bottom and tail gate. The sides 2 of the body are supported upon longitudinal sills 3, 3, connected by cross beams 4, 4, 4. The front end of the body is closed by a stationary rearwardly-inclined board 5 against which the forward end of the load is formed and packed, as will be further described in connection with the operation of the machine.

Upon the cross beams 4, 4, are secured two longitudinal channel bars 6, 6, acting to support and guide an endless apron 7, which is further sustained by a longitudinal beam or slide 8 mounted centrally upon the cross beams 4. The apron 7 forms the bottom of the box or body 1, sustains the load carried therein, and, when in motion, delivers the load to a beater-cylinder 9 mounted in the rear end of the body 1, whereby the load is distributed. The apron 7 is composed of a series of slats 10 connected by hinged links 11 and formed as an endless chain. The links are secured to the slats near each end and are arranged to fit within and slide in the channel bars 6, 6, (see Fig. 9), for which purpose the under sides of the links are provided with lugs or projections 12 adapted to fit within said channels and to guide the apron and retain it in position.

At the front and rear of the body 1, the apron 7 passes around suitable sprocket wheels or spiders 13 adapted to engage the links 11 and thereby drive the apron along the channels 6, 6. The sprockets 13 are carried upon horizontal transverse shafts 14 and 15 mounted in bearings secured to the sills 3, 3 at the front and rear of the machine. For the purpose of adjusting the apron and taking up slack due to wear of the parts, the bearings 16 (in which the forward shaft 14 rotates) are formed in blocks 17 (Fig. 8) mounted to slide longitudinally on rails 18 formed on the upper side of angular bracket-plates 19 secured beneath the under sides of the sills 3, 3. The blocks 17 are held against displacement by lips 20 which embrace the rails 18, and are moved along the same by means of adjusting screws 21 passing through the upright arms 22 of the brackets and through nuts 23 held in recesses 24 in the blocks 17.

The endless apron 7 passes along the supporting channels and around the spiders or sprockets on the shafts 14 and 15, and the lower portion of the chain, as it returns under the body, is sustained by rollers 25 carried by a horizontal transverse shaft 25ª carried in bearings 26 on a cross bar 27 under the frame of the body. It is also supported toward the forward end of the vehicle by a roller 25ᵇ.

The body 1 with the apron and its sustaining and driving mechanism is carried by a front axle 28 provided with the usual ground-wheels 29 and with a fifth-wheel 30 by which it is allowed turning movement to guide the machine, and a rear axle 31 mounted in bearings on the under side of the sills. The rear axle carries ground-wheels 32 provided with ratchet clutches (not shown) arranged in the hubs in such manner as to drive the axle 31 on the forward motion of the ground-wheels, and leave the axle inactive on the rearward movement thereof. Secured to the axle 31, between the ground-wheel and the body of the machine, is a driving-gear 33 arranged to intermesh with a pinion 34 which is revoluble on and adapted to slide on the end of a countershaft 35 carried in suitable bearings 36 that are secured to the sills 3, 3.

Fixed on the countershaft 35, adjacent to the pinion 34 is a sprocket-gear 37, the same being formed in two parts, 37ª and 37ᵇ, of which one is fixed to the shaft, and the other of which is movable in relation thereto, as will presently be described. The movable member is provided on its face with teeth 38, forming one member of a clutch; and adapted to interlock with corresponding teeth 39 forming the second member of said clutch and carried on the inner face of the sliding pinion 34. Movement of the sliding pinion 34 is effected through the agency of a forked shifter-lever 40 which engages in an annular groove 41 in the hub of the pinion 34. The shifter-lever 40 is pivotally secured in a block 42 secured on the sill 3, and its movement (to shift the pinion 34 and clutch teeth 39 into interlocked position with the corresponding parts 38 carried by the sprocket) is controlled by a rod 43 engaging in a plate 44 secured at an intermediate point on the shifter-lever 40. The rod 43 extends transversely under the body 1 and is provided at its outer end with a roller 45 adapted to slide in a slot 46 in a bracket plate 47 secured to the side of the machine and to be moved and actuated to slide in said slot and to operate the said shifter-lever by means of a cam slot 48 formed in a horizontal cam-plate 49 pivotally secured in the bracket-plate 47. This horizontal cam-plate 49 is provided with an extension 50 and is actuated on its pivot by a link 51 which extends forwardly therefrom and connects, above the fulcrum 52, with a pivoted control-lever 53 adapted to engage, by a suitable locking means 54, with notches 55 in a sector-plate 56 mounted on the forward side of the body 1. The cam slot 48 is formed with an actuating portion 48$^a$ angularly disposed as regards the pivotal point of the cam-plate 49, and with an extended slot concentrically arranged in relation to said point. As a result of this construction, movement of the control-lever and connecting link, for a limited distance, will actuate the rod 43 and thereby move the clutch members into engagement; after which the actuation of the control-lever may be continued to the limit of its movement without disturbing the position of the clutch members. This construction is of great importance, as it renders it possible to utilize one portion of the movement of the control-lever for connecting the power mechanism, and leaves the remaining movement or travel of the lever to be utilized in controlling the operation of the apron-feed-mechanism as will presently be described.

As a means for assisting the release of the clutch teeth, the rod 43 is provided with a spring 43$^a$ interposed between the shifter-lever 40 and the side of the body 1 and retained in position by a sleeve 43$^b$ secured on the rod 43 by a screw therein, whereby its position may be adjusted, and forming a shoulder by which the rod 43 operates to actuate the shifter-lever for disengaging the parts.

The countershaft 35, when connected by the clutch mechanism just described, is adapted to drive the beater-cylinder by means of the sprocket gear 37, and to operate the apron-drive-mechanism by a crank arm 57, as will presently be further described.

In the rear end of the body 1 and extending transversely of the same and disposed in operative relation to the apron 7, is a beater-cylinder 9, comprising a series of bars 58$^a$ provided with regularly disposed teeth 58$^b$. These bars are carried by and secured to head-castings 58$^c$ secured upon a shaft 59 which is adapted to rotate in bearings 60 in brackets 61 secured to the rear end of the body. The cylinder, in action, operates to detach and distribute the load as it is presented to it by the moving apron 7. The beater-cylinder shaft 59 is provided with a sprocket pinion 62 which is connected to the sprocket gear 37 by a suitable chain 63.

As the operation of the beater-cylinder (both in its starting movement and in overcoming conditions due to inequalities in the material upon which it operates) is attended with resistance and wide variation of strain, a cushioning mechanism is provided to preclude injurious results and to prevent breakage and injury to the parts.

Referring to Figs. 6 and 7, it will be seen that the gear 37 as already described, is constructed in two parts 37$^a$ and 37$^b$ movable in relation to each other. One of the parts 37$^a$, carries the clutch teeth 38, previously referred to and by which it is driven; and the other, 37$^b$, is fast on the countershaft and is provided with sprocket teeth, and is connected by the chain 63 to the beater-cylinder-pinion 62. Between the members 37$^a$ and 37$^b$ are interposed cushion or buffer-springs 37$^c$ seated in recesses 37$^d$ formed in the parts and adapted to engage against abutments 37$^e$ and 37$^f$ carried by the respective members. Rotary movement of the parts 37$^a$ and 37$^b$ in relation to each other is positively limited by lugs 37$^g$ formed upon the part 37$^a$ and which engage and move in limiting and guiding slots 37$^h$ in the other member. As the sprocket 37 is revolved and an extra strain is imposed upon the chain by starting or by unusual load-conditions, the springs will act to absorb all shock and strain and thereby relieve the working parts of the machine.

The endless apron is driven, to present the contained load to the beater-cylinder, by the following mechanism: The rear apron-carrying shaft 15 is provided with a gear 15$^a$ which intermeshes with a pinion 64 carried by the hub of a ratchet-wheel 65 mounted on a stub-shaft 66 secured to the frame of the machine. The ratchet-wheel is actuated by pawls 67 pivotally mounted in the free ends of levers 68 which are pivotally mounted on the stub-shaft 66 and capable of rotation thereon to effect engagement of the pawls with the teeth of the ratchet and thereby revolve the same to actuate the pinion 64 and gear 15$^a$ for driving the shaft 15. The pawl levers 68 are actuated by links 69 pivoted at a point common to both links on a block 70 located above the ratchet-wheel and in line with the same. Said block is secured upon the end of an oscillating member or walking-beam 71 mounted to rock on a shiftable fulcrum 72 and actuated by a connecting rod 72ª secured at its forward end to and connecting with the crank-arm 57, previously referred to. The fulcrum or pivot 72 of the walking-beam 71 is carried for a shifting movement by a sliding block 73 disposed on a support 74 which is horizontally arranged on the side of the machine and extends forward to a point near the countershaft 35 where it is secured to an upright bar 74ª, between which and a rub-iron 75, the end of the walking beam 71 is guided and prevented from lateral displacement. Extending between the rub-iron 75 and the block 70 is a bar 75ª, by which said block 70 and the beam 71 are maintained in operative position.

The block 73 is connected by a forwardly-extending rod 73ª with the upper end of the control-lever 53, previously referred to; and forward movement of said lever acts, through the link, to move the block 73 on the support 74 and thereby shifts the fulcrum or pivot of the walking-beam and, in consequence, changes the movement of the latter relative to the links that operate the pawls which move the ratchet-wheel 65 and drive the apron.

The control-lever 53, as will have been noted, has several functions and controls the operation of the entire driving mechanism. The arrangement of the parts is such that the forward movement of the control-lever to its first notch 55ª in the sector-plate, operates (through the link 51 and cam-plate 49 and connected parts) to actuate the clutch-mechanism and connect the countershaft 35 to the ground-wheels, thereby effecting rotation of said countershaft and causing the beater-cylinder to revolve. The action so far, however, does not cause sufficient movement of the sliding block 73 to actuate the pawl-mechanism to drive the apron, and, therefore, said apron still remains inactive. Further forward movement of the control-lever operates (through the rod 77) to shift the fulcrum of the walking-beam forward and thereby causes the said beam to rock (through the action of the crank and connecting rod) in a wider angle. This actuates the pawl-mechanism and starts the apron into movement to present the load to the beater-cylinder.

As the control-lever continues in its forward movement, the angle of movement of the walking-beam increases, and the consequent speed of the apron is greater, with the result that a greater amount of material is presented to it in a given time. It will be noted that the control-lever starts the machine and controls both the beater-drive and the apron-drive, and also controls the quantity of material distributed by the machine.

The range of feed in the machine under consideration varies from one (1) to thirty (30) loads per acre, more or less, according to the quality and kind of material handled.

For the purpose of preventing undue pressure by the load against the beater-cylinder, a pivoted rake 75 is mounted to swing in front of the beater-cylinder. The rake is supported in bearings 75ª carried by uprights 75ᵇ secured to the sides of the body. The rod 75ᶜ forming the pivot of the rake is provided with a depending arm 75ᵈ by which the position of the rake is governed.

The rake has two functions; first, it acts, while the drive-mechanism is disconnected and the apron and beater-cylinder are inactive, to prevent the load from falling against the beater-cylinder and clogging its starting movement, and, while performing this function, it is controlled by a locking mechanism, presently to be described; secondly, the rake acts, when released by the locking-mechanism, to restrain undue pressure of the load against the cylinder as it is presented by the rearwardly-moving apron while the machine is in operation. While so operating, it is controlled by a tension-device to be presently described. The tension-device is provided with adjusting means to meet varying conditions, and the locking-mechanism is automatically released by the action of the control-lever 53 previously referred to, and is automatically engaged by the action of the tension-device.

The locking-means consists of a latching-lever 76 pivotally mounted near its center in a bracket 77 formed on the block 73. One end of the lever 76 extends forwardly from its fulcrum 77 and normally is in the position illustrated in Fig. 1, and, thus, is in the path of movement of a stud 78 carried by the arm 75ᵈ. The other portion of said lever extends rearwardly and is engaged by a projection 73ᵇ on the sliding-block 73, and which projection limits the downward movement of said rearwardly-extending portion of said lever 76 and, in consequence, limits movement of the lever itself in one direction. A retractile spring 76ª, attached at one end to the block 73 and at the other end to said lever, operates to hold the lever in normal position, as shown in Fig. 10. When said block 73 is actuated in a forward direction by the forwardly-extending rod 73ª, the block 73 is shifted on its support 74. This causes the lever 76 to be drawn forwardly. During such forward movement, the lower edge of the rearwardly-extending portion of said lever rides on the corner 74ˣ of the support 74 and causes the lever 76 to be rocked on its fulcrum. As the block 73 continues its forward travel the end of said lever slides on the upper edge of said support 74. When the block 73 is returned to its original position, the lever will be restored to its normal position, shown in Fig. 1. While in the forward position, the lever 76 is out of position to be engaged by the stud 78. The rake is normally held in its forward position, away from the beater-cylinder, by a forwardly-extending rod 79 which is pivoted to the arm 75$^d$ and passes through a bracket-plate 80 secured to the side of the body. In front of the bracket-plate a spiral spring 80$^a$ surrounds the rod, the spring being compressed on the rearward movement of the rod by a collar 81 bearing against its free end. The forward end of the rod is connected by sliding blocks 83 and 84 to an adjusting rod 85, there being an adjusting-spring 86 mounted on the rod between said sliding-blocks. The adjusting rod passes at its forward end through an eye in a notched locking-plate 87, is bent at an angle to engage the notches in said plate, and is provided with a ball or weight 85$^a$ on the angular arm for holding the rod in engagement with the notched locking-plate.

As the locking-lever 76 is carried forwardly by the forward movement of the block 73 and, thus, moved out of engagement with, and beyond, the stud 78, as aforementioned, and the load pressed against the rake by the moving apron, the springs 80$^a$ and 86 will be compressed, thereby holding the load and permitting it to approach the beater-cylinder gradually. The tension imposed upon the rake may be varied by means of the adjusting-rod and the locking-plate to meet various conditions of material and load. When the load is discharged, the rake will be returned to its forward position by the pressure of the springs, and, when so returned, will be retained and held by the latching-lever which acts to hold it against the stud 78 on the arm 75$^d$.

It will have been noted, in connection with the above description, that all of the movements of the various operating-mechanisms of the machine are controlled by a single control-member, namely, the manually-operated lever 52 whereby the operation and work of control are simplified and facilitated.

The forward end-board or gate 5, already referred to, is inclined rearwardly at its upper end so that the load, as the apron begins its rearward travel to feed and deliver to the beater, will be so packed at the front that it will not fall forwardly away from the mass. This will cause the forward end of the load to be carried toward the beater in a solid mass, and will prevent the manure from falling or shaking back onto the apron as the load is moved away from said end-board. This obviates the necessity of moving the apron farther rearwardly than would otherwise be necessary in order to deliver the entire load.

While we have in the foregoing description set forth the details of construction, it is to be understood that we do not limit our invention to such details except in so far as they may be specified in the claims.

Having thus fully described our invention and its mode of operation, what we desire to secure by Letters-Patent is:

1. In a manure-spreader, an endless one-way traveling load-carrying apron, mechanism for effecting its travel to discharge its load, including a wheel-driven shaft, a rocking-member operatively connecting therewith, and a longitudinally shiftable device supporting said member, clutch-mechanism adapted to derive actuation from said wheel-driven shaft, a beater-cylinder disposed adjacent the point of discharge of the load, mechanism for operating said beater-cylinder and, through said clutch-mechanism, connecting with and deriving movement from, said shaft, and a control-device connecting with said rocking-device and clutch-mechanism and shiftable to a plurality of operative positions, first to initiate rotation of said beater-cylinder, and, then, successively, to initiate travel of said apron, and to accelerate such travel.

2. In a manure-spreader, an endless one-way traveling load-carrying apron, mechanism for effecting its travel, including a wheel-driven shaft, a rocking member operatively connecting therewith, and a longitudinally-shiftable device supporting said member, clutch-mechanism adapted to derive actuation from said shaft, a beater-cylinder disposed at the point of load-discharge. wheel-driven mechanism for rotating said beater-cylinder, and, through said clutch-mechanism, connecting with and deriving movement from, said shaft, and a control-device connecting through said shiftable device and clutch mechanism with the apron-driving mechanism and beater-driving mechanism, and operating to successively actuate said beater and apron-driving mechanisms.

3. In a manure spreader, a one-way traveling load-carrying apron, a beater-cylinder disposed adjacent the point of discharge of the load, a shiftable rake-member arranged in juxtaposition to the spreader-cylinder, mechanism for driving said apron including a driving-shaft and a vertically-oscillating member pivoted intermediate of its ends. means disposed adjacent the fulcrum of said oscillating member and adapted to control the position of said rake-member, a speed-changing gear connecting with said oscillating member, a longitudinally shiftable supporting device, and a single control device operatively connecting with said driving-mechanism and speed-changing gear and operative successively to actuate said apron-drive and to vary the speed thereof.

4. In a manure-spreader, a load-carrying apron, intermittently-operating mechanism including a shiftable fulcrum-element and an oscillating-member operatively mounted thereon for driving said apron toward discharging position, ground-wheel driven means connecting with said mechanism for actuating it, a rotating beater-cylinder disposed in the path of travel of said apron, beater-driving mechanism actuated independently of said apron-driving mechanism, and a control-device shiftable to successively actuate said beater and apron-driving mechanisms and to vary the speed of said apron-driving mechanism whereby a predetermined quantity of material may be delivered to said beater within a given time or area of travel of the spreader.

5. In a manure-spreader, an endless one-way traveling load-carrying apron, apron-driving mechanism for effecting travel of said apron including a driving-shaft, speed-changing mechanism including a shiftable fulcrum-element, and an oscillating-member pivoted on said fulcrum-member, a rake-member arranged adjacent the point of the discharge of the load, one part of said oscillating member being adapted to engage and hold said rake-member in position, and a control-member connecting with said mechanisms and shiftable, first, to actuate said apron-driving mechanism and, then, said speed-changing mechanism.

6. In a manure-spreader, an endless load-carrying apron, apron-driving mechanism connected therewith, wheel-driven mechanism operatively connected to said apron-driving mechanism and including a movable fulcrum-element and a member movably attached thereto and adapted to be actuated in a direction at an angle to the direction of movement of the fulcrum-element, a beater arranged in juxtaposition to the discharging position of the apron, mechanism for driving said beater, a clutch-device connecting with said beater-driving mechanism, and a single control-device connecting with said apron-driving and with said clutch-mechanism, whereby the members of said clutch may be actuated to effect operation of the beater-driving mechanism, and whereby operation of the apron-driving mechanism is then initiated and travel of said load-carrying apron effected and accelerated to any predetermined rate of speed.

7. In a manure-spreader, an endless one-way traveling load-carrying apron, apron-driving mechanism connected therewith, speed-changing mechanism connected with said apron-driving mechanism and including a movable fulcrum-element and a member movably attached thereto and adapted to be actuated in a direction at an angle to the direction of movement of the fulcrum-element, a beater-cylinder arranged in juxtaposition to the point of discharge of the load-carrying apron, beater-driving mechanism operatively connected to the beater-cylinder, a clutch-device connecting with said beater-driving mechanism, and a single control-device whereby, when moved initially, said clutch-device is actuated to operate the beater-driving mechanism, and, when further moved, said apron-driving mechanism is actuated to effect travel of the apron and, when its movement is continued, said speed-changing mechanism is actuated.

8. In a manure-spreader, an endless one-way traveling load-carrying apron, apron-driving mechanism connected therewith, a beater-cylinder arranged in juxtaposition to the point of discharge of the load-carrying apron, beater driving mechanism operatively connected to the beater-cylinder, a rake arranged in juxtaposition to the beater-cylinder and movable with relation thereto, a rake-locking device normally disengaged from the rake and shiftable into operative relation thereto, and a single control-device connecting with said apron-driving mechanism, with said beater-driving mechanism, and with said rake, locking-device whereby when it, said control-device, is moved initially, said beater-drive mechanism is actuated said rake is released for movement toward the beater-cylinder, and when further moved, said apron-driving mechanism is actuated to effect travel of the apron.

9. In a manure-spreader, an endless load-carrying apron, apron-driving mechanism connected therewith and comprising a walking-beam, a beam-fulcrum-member upon which said walking-beam is pivoted, pawl-mechanism supported on said walking-beam, and a ratchet-wheel with which said pawl-mechanism coöperates, in combination with a beater-cylinder arranged in juxtaposition to the point of discharge of the load-carrying apron, beater-driving mechanism operatively connected to the beater-cylinder, a clutch device connected with said beater-driving mechanism, and a single control-device connecting with said apron-driving mechanism, with said beam-fulcrum member, and with said beater-driving mechanism whereby it, said control-device, when moved initially will actuate said clutch-device to actuate the beater-driving mechanism, and when said control-device is further moved, to operate the apron-driving mechanism to effect travel of the apron, and, when movement of said control-device is continued, to shift said fulcrum member and thereby change the speed of the apron.

10. In a manure-spreader, a load-carrying apron, apron-drive mechanism connected therewith, a beater-cylinder arranged in the path of travel of the apron, mechanism for effecting rotation of said beater-cylinder, a clutch-device connected to the beater-operating means, means for actuating said clutch-device including a shifter-lever connecting with one member of said clutch-device, a spring acting thereon for normally holding the member of the clutch disconnected, a transverse shifter-moving rod connecting with, and longitudinally movable to change the position of said shifter-lever, independently and a control-lever connected to the apron-driving mechanism and to said shifter-moving rod to actuate, independently, said driving-mechanism and said rod, and whereby said beater-cylinder is actuated and, then, in succession, said apron-driving mechanism.

11. In a manure-spreader, an endless one-way traveling load-carrying apron, apron-driving mechanism connected therewith, a beater-cylinder disposed in the path of travel of said apron, beater-driving mechanism, a rake-member arranged in juxtaposition to but normally away from the beater-cylinder, and a control-member shiftable to a plurality of positions whereby, in one position, said beater-cylinder-drive mechanism is actuated and said rake-member is automatically released for movement toward the beater-cylinder, and, in another position, said apron-driving mechanism is actuated, and in still another position said apron-driving mechanism is given an accelerated movement.

12. In a manure-spreader, an endless load-carrying apron, apron-driving mechanism connected therewith, a beater-cylinder disposed in the path of travel of said apron, beater-driving mechanism, a rake-member arranged in juxtaposition to but normally away from the beater-cylinder, a control-member shiftable to a plurality of positions whereby, in one position, said beater-cylinder-drive mechanism is actuated and said rake-member is automatically released for movement toward the beater-cylinder, and, in another position, said apron-driving mechanism is actuated, and in still another position said apron-driving mechanism is given an accelerated movement, and an automatically-operated rake-stop device connecting with said rake.

13. In a manure-spreader, an endless load-carrying apron, apron-driving mechanism connected therewith, a beater-cylinder disposed in the path of travel of said apron, beater-driving mechanism, a rake-member arranged in juxtaposition to but normally away from the beater-cylinder, a control-member shiftable to a plurality of positions whereby, in one position, said beater-cylinder-drive mechanism is actuated and said rake-member is automatically released for movement toward the beater-cylinder, and, in another position, said apron-driving mechanism is actuated, and in still another position said apron-driving mechanism is given an accelerated movement, an automatically-operated rake-stop device connecting with said rake, and a tensioning device for said rake-operating mechanism.

14. In a manure-spreader, an endless one-way traveling load-carrying apron, means for driving the same, a beater arranged in the path of said apron, ground-wheel mechanism for driving said beater, a clutch connected to said driving mechanism, a clutch-controlling mechanism whereby the ground-wheels are coupled to the beater-drive mechanism, and a control-device including a hand-lever and two actuating members separately attached thereto and connected to said mechanisms and operable to actuate the same, said device being adapted, after throwing the beater-driving mechanism into operation, to have a continued movement whereby the apron is started on its travel and, then, accelerated to increase the discharge of material from the spreader.

15. In a manure-spreader, an endless load-carrying apron, mechanism including a rocking element and a longitudinally shiftable member for effecting its travel to discharge its load, a beater-cylinder disposed adjacent the point of discharge of the load, mechanism for operating said beater-cylinder, and a control-device shiftable to a plurality of operative positions, first to initiate rotation of said beater-cylinder, and, then, successively, to initiate travel of said apron, and to accelerate such travel.

16. In a manure-spreader, an endless load-carrying apron, mechanism for effecting travel of said apron including a shiftable fulcrum-block, a support therefor, a rocking beam fulcrumed on said block, a pawl-carrying device carried by said beam, a ratchet with which said device coöperates, and a crank-shaft connecting with the opposite end of said beam, a beater-cylinder disposed at the point of load-discharge, wheel-driven mechanism for rotating said beater-cylinder, and a control-device connecting with the apron-driving mechanism and with the beater-driving mechanism, and operating to successively actuate said beater-driving and apron-driving mechanisms.

17. In a manure-spreader, an endless load-carrying apron, apron-driving mechanism connected therewith and including a rocking element and a longitudinally shiftable member, speed-changing mechanism connected with said apron-driving mechanism, a beater-cylinder arranged in juxtaposition to the point of discharge of the load-carrying apron, beater-driving mechanism operatively connected to the beater-cylinder, a clutch device connecting with said beater-driving mechanism, and a single control device connecting with said apron-driving mechanism, with said speed-changing mechanism, and with said clutch-device, whereby, when moved initially, said clutch-device is actuated to operate the beater-driving mechanism, and, when further moved, to actuate said apron-driving mechanism to effect travel of the apron and, when its movement is continued, said speed-changing mechanism is actuated.

18. In a manure-spreader, an endless load-carrying apron, mechanism for effecting its travel to discharge its load and including a rocking element and a longitudinally shiftable member, a ratchet-wheel and pawls engaging therewith and actuated by said rocking member, a beater-cylinder disposed adjacent the point of discharge of the load, mechanism for operating said beater-cylinder, and a control-device shiftable to a plurality of operative positions, first to initiate rotation of said beater-cylinder, and, then, successively, to initiate travel of said apron, and to accelerate such travel.

19. In a manure-spreader, a load-carrying apron, mechanism for driving said apron and including a rocking element and a longitudinally shiftable element, combined with a pawl-and-ratchet device at one end of said rocking-element and a crank-member at the other, a spreader-cylinder arranged in juxtaposition to the discharging point of the apron, cylinder-drive mechanism operable independently of said shiftable element, and a single control device operable successively to actuate said beater-drive and said rocking element.

20. In a manure-spreader, a load-carrying apron, mechanism for driving said apron and including a rocking element and a longitudinally shiftable element, a spreader-cylinder arranged in juxtaposition to the discharging point of the apron, cylinder-drive mechanism operable independently of said shiftable element, a single control device operable successively to actuate said beater-drive and said rocking element, a shiftable rake-member arranged in juxtaposition to the spreader-cylinder, rake locking mechanism, and means for shifting the same to release the rake.

21. In a manure-spreader, a load-carrying apron, mechanism for driving said apron and including a rocking element and a longitudinally shiftable element, a spreader-cylinder arranged in juxtaposition to the discharging point of the apron, cylinder-drive mechanism operable independently of said shiftable element, a single control device operable successively to actuate said beater-drive and said rocking element, a shiftable rake-member arranged in juxtaposition to the spreader-cylinder, rake locking mechanism, and means for shifting the same to release the rake, said rake-releasing mechanism connecting with said control device.

22. In a manure-spreader, an endless one-way traveling load-carrying apron, a spreader-cylinder arranged contiguous to the discharging point of the apron, apron-drive mechanism including a pivoted oscillating member, a shiftable fulcrum-element upon which said member is movably mounted, means for shifting the fulcrum element whereby the speed of said apron-drive mechanism may be varied, a rake-member arranged in juxtaposition to the spreader cylinder, a rake-locking device adapted to be positioned by said fulcrum-element, and means for positioning said rake-member relative to the cylinder.

23. In a manure-spreader, an endless load-carrying apron, apron-driving mechanism connected therewith and including a walking-beam, a beam-fulcrum member upon which said walking-beam is pivoted, pawl-mechanism supported on said walking-beam, and a ratchet-wheel with which said pawl-mechanism coöperates, in combination with a beater-cylinder arranged in juxtaposition to the point of discharge of the load-carrying apron, beater-driving mechanism operatively connected to said beater-cylinder, a clutch-device connected with said beater-driving mechanism, a single controlling device connected with said apron-driving mechanism, with said beam-fulcrum member, and with said beater-driving mechanism and operating, when moved initially, to actuate said clutch-device for operating the beater-driving mechanism and when further moved operating to actuate the apron-driving mechanism and effect travel of the apron, and a rake-device arranged in juxtaposition to the spreader-cylinder, and means for positioning said rake relatively to the beater-cylinder.

24. In a manure-spreader, a load-carrying apron, apron-driving mechanism connected therewith, a beater disposed in the path of travel of said apron, beater-driving mechanism, a rake-member arranged in juxtaposition to but normally away from the beater, means normally disconnected from said rake-member and shiftable into engagement therewith to lock it in normal position, and mechanism connecting with said rake and operative to position the same and including an actuating rod and a tension-device connecting therewith.

25. In a manure-spreader, a load-carrying apron, apron-driving mechanism connected therewith, a beater disposed in the path of travel of said apron, beater-driving mechanism, a rake-member arranged in juxtaposition to but normally away from the beater, means normally disconnected from said rake-member and shiftable into engagement therewith to lock it in position, mechanism connecting with said rake and operative to position the same and including an actuating rod and a tension-device connecting therewith, and a manually-manipulated member connecting with said actuating rod and shiftable into any of a plurality of operative positions.

26. In a manure-spreader, a load-carrying apron, apron-driving mechanism connected therewith, a beater disposed in the path of travel of said apron, beater-driving mechanism, a rake-member arranged in juxtaposition to but normally away from the beater, means normally disconnected from said rake-member and shiftable into engagement therewith to lock it in position, mechanism connecting with said rake and operative to position the same and including an actuating rod and a tension-device connecting therewith, and an adjusting-device connecting with said actuating rod to govern the position of the rake according to varying conditions.

27. In a manure spreader, a load-carrying apron, apron-driving mechanism connected therewith, a beater disposed in the path of travel of said apron, beater-driving mechanism, a rake-member arranged in juxtaposition to but normally away from the beater, means normally disconnected from said rake-member and shiftable into engagement therewith to lock it in position, mechanism connecting with said rake and operative to position the same and including an actuating rod and a tension-device connecting therewith, a control-lever for releasing said locking means, and a tension-device for automatically operating said locking means.

In testimony whereof we hereunto set our hands this 30th day of November, 1909, in the presence of two attesting witnesses.

ALEXUS C. LINDGREN.
GUNDER G. MANDT.

Witnesses:
L. C. BLANDING,
C. A. BARRISTER.